(12) United States Patent
Tomsett et al.

(10) Patent No.: US 12,182,923 B1
(45) Date of Patent: Dec. 31, 2024

(54) SYNTHETIC LIFELIKE BEHAVIORAL CHARACTER ANIMATION SYSTEM AND BEHAVIOR COMPONENT EVALUATION METHODS FOR DETERMINING LIFELIKE BEHAVIOR OUTPUTS THAT DRIVE CHARACTER ANIMATION

(71) Applicant: UneeQ Limited, Auckland (NZ)

(72) Inventors: Daniel Lance Tomsett, San Marcos, TX (US); Victor Kar Ho Yuen, Botany Downs (NZ)

(73) Assignee: UneeQ Limited, Auckland (NZ)

( * ) Notice: Subject to any disclaimer, the term of this patent is extended or adjusted under 35 U.S.C. 154(b) by 0 days.

(21) Appl. No.: 17/973,409

(22) Filed: Oct. 25, 2022

Related U.S. Application Data

(60) Provisional application No. 63/271,447, filed on Oct. 25, 2021.

(51) Int. Cl.
*G06T 13/40* (2011.01)
*A63F 13/55* (2014.01)
*A63F 13/56* (2014.01)
*G06T 7/73* (2017.01)

(52) U.S. Cl.
CPC ............. *G06T 13/40* (2013.01); *A63F 13/55* (2014.09); *A63F 13/56* (2014.09); *G06T 7/75* (2017.01)

(58) Field of Classification Search
CPC .......... G06T 13/40; A63F 13/55; A63F 13/67; A63F 13/833; A63F 13/847; A63F 13/26; A61B 5/744
See application file for complete search history.

(56) References Cited

U.S. PATENT DOCUMENTS

| | | | |
|---|---|---|---|
| 11,010,129 B1 * | 5/2021 | Rakshit | G06F 9/453 |
| 11,830,121 B1 * | 11/2023 | Starke | G06N 3/02 |
| 2019/0035132 A1 * | 1/2019 | Dirksen | G06F 18/2135 |
| 2021/0358613 A1 * | 11/2021 | Kaleal, III | G16H 40/63 |
| 2022/0355188 A1 * | 11/2022 | Tsuchiya | A63F 13/213 |
| 2023/0186542 A1 * | 6/2023 | Gotoh | G06F 3/165 |
| | | | 345/419 |
| 2024/0149162 A1 * | 5/2024 | Lei | A63F 13/56 |
| 2024/0257429 A1 * | 8/2024 | Starke | A63F 13/573 |

* cited by examiner

*Primary Examiner* — Jin Cheng Wang
(74) *Attorney, Agent, or Firm* — Sprinkle IP Law Group

(57) ABSTRACT

A synthetic lifelike behavioral character animation system and methods for simulating lifelike behavior in an animated character. The system provides simulated lifelike character behavior for use in a variety of interactive contexts such as AI interactive agents, video games, and metaverse-type experiences. The system processes contextual information and generates behavioral outputs that drive character animation that is lifelike and believable in nature.

14 Claims, 4 Drawing Sheets

SYNTHETIC LIFELIKE BEHAVIORAL CHARACTER ANIMATION SYSTEM AND BEHAVIOR COMPONENT EVALUATION METHODS FOR DETERMINING LIFELIKE BEHAVIOR OUTPUTS THAT DRIVE CHARACTER ANIMATION

CLAIM OF BENEFIT TO PRIOR APPLICATION

This application claims benefit to U.S. Provisional Patent Application 63/271,447, entitled "System for automated synthesis of animation for digital humans," filed Oct. 25, 2021. The U.S. Provisional Patent Application 63/271,447 is incorporated herein by reference.

BACKGROUND

Embodiments of the invention described in this specification relate generally to digital character animation, and more particularly, to a synthetic lifelike behavioral character animation system that simulates lifelike behavior in an animated character and behavior component evaluation methods for determining lifelike behavior outputs that drive character animation.

Creating immersive interactive three-dimensional (3D) experiences requires compelling and believable characters. These characters may be the main protagonist or they could be background actors that make an environment feel alive.

In the current state of the art for interactive experiences, such as in video games, characters are mostly scripted. The behavior of such scripted characters during a game, and especially the character's "in game" behavior (that is, while the player is in control), typically exhibit repetitive or predictable animation and behavior. This limitation in creating a lifelike immersive interactive 3D experience is largely due to the overwhelming effort that is required to produce all the animation assets and create sophisticated logic trees that would allow a character to exhibit different behaviors in all the different scenarios that might arise during game play.

This is also true in the emerging field of interactive artificial intelligence (AI) agents, where a user may interact by speaking or otherwise communicating (e.g., written form) in natural language with an AI powered agent. The responses of the AI to the user's natural language utterances are most often determined by a Natural Language Processing (NLP) system. Furthermore, most AI agent systems employ a predefined set of animations which often results in a looped or repetitive style behavior. Once again, the effort and sophistication required to provide lifelike AI agents for interactions with human users is just overwhelming and, consequently, is currently limited to basic behavior.

As the scale and sophistication of interactive experiences become even greater than the interactive experiences available in the present, the challenges in bringing forth high-quality, lifelike responsive characters increase. In many regards, characters present one of the greatest limiting factors of providing overall high quality interactive experiences, regardless of many awe inspiring improvements in other aspects of the interactive experience, such as simulated environments. Recent examples of this can be seen in Star Citizen and Cyberpunk 2077, where the simulated environments are enormous but populated by characters that are not much more than props in the environment.

Because compelling and believable characters are nearly essential to the overall immersive interactive experience, the current inability to provide compelling and believable characters is a problem.

In general, making a character compelling and believable is about making the character feel alive. Animation behavior is a critical component of making a character feel alive. In order to feel alive, the character needs to move in a way that evokes some sense of contextual awareness that is not simply repetitive or predictable. Similarly, the character feels alive with a sense of agency to act, react, respond, etc., in a manner befitting environmental and situational contexts, as well as one that is internally aware or subtly modulated by their personality and feelings, etc.

In an interactive AI agent example, the character might change the way they gesture based on the sensitivity of the conversation. Perhaps the topic is more serious in nature which results in a more subdued or somber behavior by the AI agent. By contrast, if the topic is wild or the user's interaction with the AI agent demonstrates a higher degree of excitability, the AI agent may behave in a manner more suitable to the situation (e.g., reflecting, perhaps, more excitement by the AI agent in responses to the excitable user).

In an open world game, minor characters that populate the environment might react to the user's character waving to them or they might run scared if the user displays aggressive behavior near them.

To date, however, simulating or providing such lifelike character behavior in an immersive experience or interactive environment has not been achieved.

Therefore, what is needed is a way to provide believable, lifelike characters that are simulated to act with lifelike behavior in an immersive interactive environment no matter what contextual situation may be present.

BRIEF DESCRIPTION

A novel synthetic lifelike behavioral character animation system that simulates lifelike behavior in an animated character and novel behavior component evaluation methods for determining lifelike behavior outputs that drive character animation are disclosed.

In some embodiments, the synthetic lifelike behavioral character animation system simulates lifelike behavior in a character by breaking down character behavior into logical behavior components which collectively drive the animated movements of the character. By breaking down character behavior into logical behavior components, the synthetic lifelike behavioral character animation system is able to animate the character to react according to context in ways that demonstrate a wide range of animation behavior in interactions with users and the surrounding environment or elements in the environment, and in ways that express the character's personality, but which do not evoke a sense of being scripted or automatically/programmatically repetitive in a limited (finite) number of varied ways (although any particular character may demonstrate repetitive behavior that is evoked by certain contexts). Furthermore, the synthetic lifelike behavioral character animation system is configured to simulate lifelike behavior in any kind of character including, without limitation, digital human characters, animal characters, robot characters, alien life form characters, and other characters.

In some embodiments, the synthetic lifelike behavioral character animation system comprises (i) a plurality of behavior components and (ii) an animation system which work together under an architecture designed to account for context in an environment in simulating behavior in ways the drive animation of the character. Specifically, the behavior components work in connection with an input/output architecture and a publish/subscribe component communication architecture.

In some embodiments, the behavior components are configurable to meet a design strategy. In some embodiments, the behavior components are configured to (i) receive and process inputs, (ii) determine appropriate behaviors to output for received and processed inputs, and (iii) publish output events and corresponding metadata which subscribing behavioral components receive as inputs. In at least one embodiment, the plurality of behavior components comprise an action component, an ambient component, an attention component, an emotion component, a gaze component, a gesture component, a locomotion component, a perception component, and a speech component.

In some embodiments, the animation system receives the behavior outputs from one or more of the behavioral components and collectively turns the behavior outputs into visible animation of the character. In some embodiments, the synthetic lifelike behavioral character animation system comprises a style and personality parameter framework that provides variation in the components.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
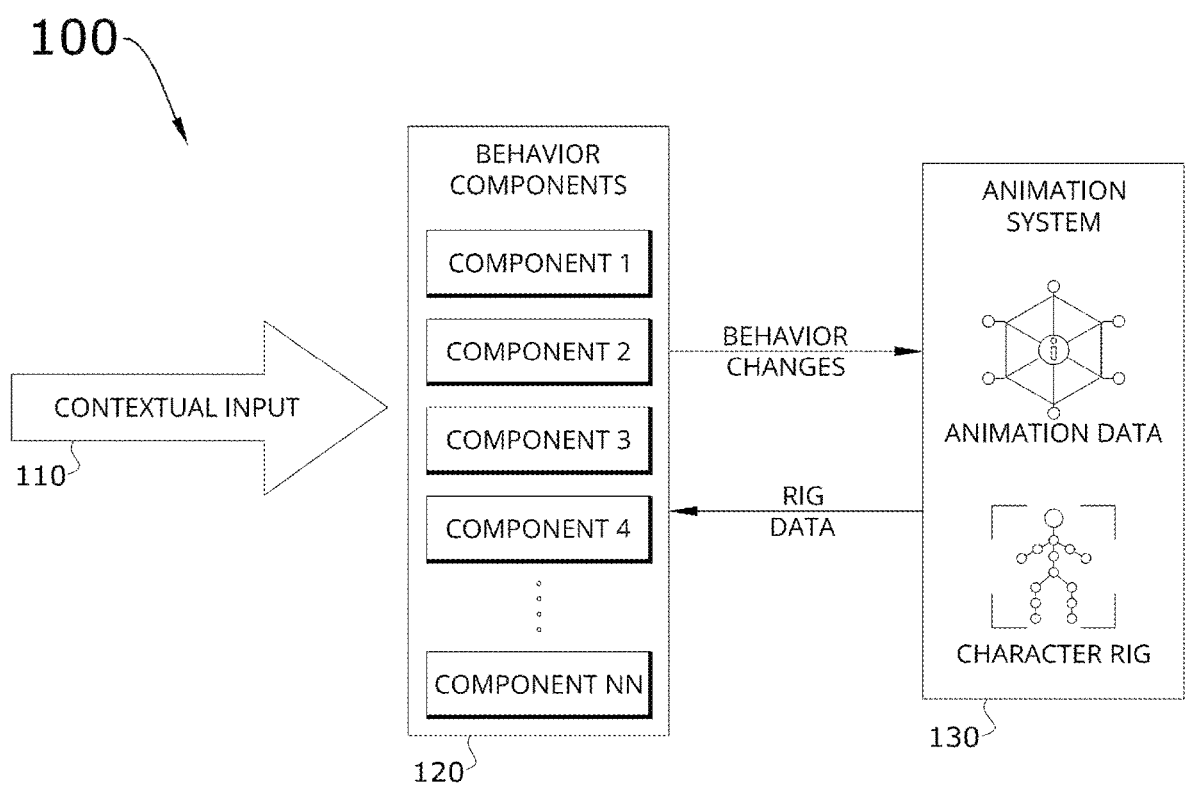
FIG. 1 conceptually illustrates a synthetic lifelike behavioral character animation system that simulates lifelike behavior in an animated character in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel synthetic lifelike behavioral character animation system that simulates lifelike behavior in an animated character and behavior component evaluation methods for determining lifelike behavior outputs that drive character animation.

In some embodiments, the synthetic lifelike behavioral character animation system simulates lifelike behavior in a character by breaking down character behavior into logical behavior components which collectively drive the animated movements of the character. By breaking down character behavior into logical behavior components, the synthetic lifelike behavioral character animation system is able to animate the character to react according to context in ways that demonstrate a wide range of animation behavior in interactions with users and the surrounding environment or elements in the environment, and in ways that express the character's personality, but which do not evoke a sense of being scripted or automatically/programmatically repetitive in a limited (finite) number of varied ways (although any particular character may demonstrate repetitive behavior that is evoked by certain contexts). Furthermore, the synthetic lifelike behavioral character animation system is configured to simulate lifelike behavior in any kind of character including, without limitation, digital human characters, animal characters, robot characters, alien life form characters, and other characters.

In some embodiments, the synthetic lifelike behavioral character animation system comprises (i) a plurality of behavior components and (ii) an animation system which work together under an architecture designed to account for context in an environment in simulating behavior in ways the drive animation of the character. Specifically, the behavior components work in connection with an input/output architecture and a publish/subscribe component communication architecture.

In some embodiments, the behavior components are configured to (i) receive and process inputs, (ii) determine appropriate behaviors to output for received and processed inputs, and (iii) publish output events and corresponding metadata which subscribing behavioral components receive as inputs. In some embodiments, the behavior components are configurable to meet a design strategy. In at least one embodiment, the plurality of behavior components comprise an action component, an ambient component, an attention component, an emotion component, a gaze component, a gesture component, a locomotion component, a perception component, and a speech component.

In some embodiments, the animation system receives the behavior outputs from one or more of the behavioral components and collectively turns the behavior outputs into visible animation of the character. In some embodiments, the synthetic lifelike behavioral character animation system comprises a style and personality parameter framework that provides variation in the components.

In some embodiments, the publish/subscribe component communication architecture supports chain events. For example, a first behavioral component publishes a first output event corresponding to a first output. A second behavioral component receives the first output event as an input, processes the input and logically determines a second output, and then publishes a second output event corresponding to the second output. In sequence, a third behavioral component receives the second output event as input, processes the input and logically determines an unexpected emergent behavior to output (third output), and then publishes a third output event corresponding to the unexpected emergent behavior of the third output. The animation system then animates the behavior based on the first, second, and third outputs (which includes the unexpected emergent behavior). For instance, the first output may instruct the animation system to demonstrate the character as being surprised (e.g., based on the first input being a surprising event in the virtual world), while the second output may instruct the animation system to increase heart rate of the animated character and the third output may instruct the animation system to increase the character's ability to focus on the subject of the surprise and block out other ambient effects in the environment based on the personality of the character. A different character with a different personality may fair differently—e.g., the animation system may be instructed to have the character with the different personality to lose all focus based on the subject of the surprise.

As stated above, creating immersive interactive 3D experiences requires compelling and believable characters. These characters may be the main protagonist or they could be background actors that make an environment feel alive. Currently, characters are mostly scripted. The "in game" behavior of such scripted characters during a game is all too often repetitive or predictable. There is a manual mechanism to individually designing each character and creating a lifelike immersive interactive 3D experience in that manner. But this is an enormous task that is not realistically possible in any time frame to keep up with technological changes the result in huge upgrades in other areas (e.g., simulated environment). There are just too many complex animation assets with sophisticated logic trees to create a character (let alone, several different characters) to exhibit different behaviors in all the different scenarios that might arise during game play. This is also true in the emerging field of interactive AI agents, where a user may interact by speaking or otherwise communicating (e.g., written form) in natural language with an AI powered agent. The responses of the AI to the user's natural language utterances are most often determined by an NLP system. Furthermore, most AI agent systems employ a predefined set of animations which often results in a looped or repetitive style behavior. Once again, the effort and sophistication required to provide lifelike AI agents for interactions with human users is just overwhelming and, consequently, is currently limited to basic behavior. As the scale and sophistication of interactive experiences become even greater than the interactive experiences available in the present, the challenges in bringing forth high-quality, lifelike responsive characters increase. In many regards, characters present one of the greatest limiting factors of providing overall high quality interactive experiences, regardless of many awe inspiring improvements in other aspects of the interactive experience, such as simulated environments. Because compelling and believable characters are nearly essential to the overall immersive interactive experience, the current inability to provide compelling and believable characters is a problem. In general, making a character compelling and believable is about making the character feel alive. Animation behavior is a critical component of making a character feel alive. In order to feel alive, the character needs to move in a way that evokes some sense of contextual awareness that is not simply repetitive or predictable. Similarly, the character feels alive with a sense of agency to act, react, respond, etc., in a manner befitting environmental and situational contexts, as well as one that is internally aware or subtly modulated by their personality and feelings, etc. To date, however, simulating or providing such lifelike character behavior in an immersive experience or interactive environment has not been achieved.

Embodiments of the synthetic lifelike behavioral character animation system and the behavior component evaluation methods for determining lifelike behavior outputs that drive character animation described in this specification solve the problems describe above by modularized behavior components and an input/output behavior component architecture and publish/subscribe communication architecture which together allow for multi-varied behavior to be determined and sent to the animation system to drive the resulting simulated character behavior in the environment.

Embodiments of the synthetic lifelike behavioral character animation system and the behavior component evaluation methods for determining lifelike behavior outputs that drive character animation described in this specification differ from and improve upon currently existing options. In particular, the current mechanisms to drive character behavior in immersive or interactive environments are typically just finite number of actions that are repetitively output in ways that are not lifelike. By contrast, the synthetic lifelike behavioral character animation system and the behavior component evaluation methods for determining lifelike behavior outputs that drive character animation provides a greater sense of a character being alive, not bound to always produce the same output behavior in a given context, but being varied by context in situation, persons/users/characters present or implied, other environmental elements, personality and style of the character, etc.

The synthetic lifelike behavioral character animation system and the behavior component evaluation methods for determining lifelike behavior outputs that drive character animation of the present disclosure may be comprised of the following elements. This list of possible constituent elements is intended to be exemplary only and it is not intended that this list be used to limit the synthetic lifelike behavioral character animation system and the behavior component evaluation methods for determining lifelike behavior outputs that drive character animation of the present application to just these elements. Persons having ordinary skill in the art relevant to the present disclosure may understand there to be equivalent elements that may be substituted within the present disclosure without changing the essential function or operation of the synthetic lifelike behavioral character animation system and the behavior component evaluation methods for determining lifelike behavior outputs that drive character animation.

1. A plurality of behavioral components
2. An animation system

The various elements of the synthetic lifelike behavioral character animation system and the behavior component evaluation methods for determining lifelike behavior outputs that drive character animation of the present disclosure may be related in the following exemplary fashion. It is not intended to limit the scope or nature of the relationships between the various elements and the following examples are presented as illustrative examples only.

Synthetic Lifelike Behavioral Character Animation System Architecture

The plurality of behavior components are provided as a series of components that collectively perform the role of simulating the behavior of the character. The number of behavior components and the function and role of each behavior component can be changed, but the concept and architecture remain the same between different sets of components utilized in any embodiment of the of the synthetic lifelike behavioral character animation system and the behavior component evaluation methods for determining lifelike behavior outputs that drive character animation. Also, behavior components are not specific to a particular character style or rig. For example, the animation system of the synthetic lifelike behavioral character animation system could be driving, for example, a robot, a realistic digital human, an animal such as a dog, or any other sort of character. Yet, for any type of character, the behavior components would still have the same design.

The synthetic lifelike behavioral character animation system of the present disclosure generally works by processing contextual inputs by the behavior components, determining output behavior based on contextual input, and outputting the behavior to the animation system to simulate the lifelike behavior in the animated character. This input/output architecture works effectively because conceptually, each behavior component is decoupled from other components, but remain in constant communication with the other components. Additional details of the input/output architecture are described in the next paragraph. Also, the communication between components is based on a publish/subscribe architecture, which is described above, and described in more detail below, by reference to FIG. 3. Thus, whenever a behavior component has something to output, it will publish this event and corresponding metadata. Other components that are interested in the output of this component will have subscribed to its published events and this will form the contextual input for their own logic as they begin to process the received output event that originated from the other component.

Input/Output Architecture for Behavior Components

In some embodiments, the plurality of behavior components function in accordance with an input/output architecture. The inputs into any given behavior component can come from a variety of different sources including, without limitation, an external system (such as the 3D environment or video stream in the case of the perception component or the dialog from a natural language system), an internal source whereby internally generated variables, such as randomly generated float numbers, are provided as input to one or more components, via other behavior components, and/or an animation system, such as joint transformation data from the rig, etc. As such, the plurality of behavior components are capable of giving rise to modularized representations of a character's behavior.

By way of example, FIG. 1 conceptually illustrates a synthetic lifelike behavioral character animation system 100 that simulates lifelike behavior in an animated character in some embodiments. As shown in this figure, the synthetic lifelike behavioral character animation system 100 comprises inbound contextual input 110, a plurality of behavior components 120, and an animation system 130. The plurality of behavior components 120 receives inbound contextual input 110 and the corresponding behavior components process the input. When a given contextual input is processed by a particular component and the particular component determines that the input results in a change in behavior, the particular component outputs a behavior to the animation system 130 and also publishes the output as an event for any subscribing components to receive as input and process accordingly. The animation system 130 receives the output as animation data to apply to the character rig, which then provides rig data back to the plurality of behavior components 120 for further processing. The plurality of behavior components 120 work in this way to provide lifelike character behavior that can be applied by the animation system 130 to the character rig for simulating lifelike behaviors in the resulting animation. This is true even when the character rig is changed in the animation system 130, since the plurality of behavior components 120 are separated from the rig. In this way, the synthetic lifelike behavioral character animation system 100 makes it possible to determine holistic behavior and apply to the rig within the animation system 130.

In some embodiments, each behavior component has an area of responsibility. For example, the area of responsibility of the perception component is the character's perception (of environment, self, etc.). In some embodiments, each behavior component also has a behavior logic which defines output behavior with respect to the area of responsibility of the behavior component. In some embodiments, the combined outputs of the plurality of behavior components collectively define character behavior. In this way, the behavior components are able to generate a holistic behavior of the character. Also, to achieve this holistic behavior of the character, the behavior components are designed to work in harmony with constant communication between each other, ensuring that behaviors are not in conflict and blend together well.

For example, the gaze component causes the character to look quickly in a different direction. As the character shifts their gaze, the behavior is recognized as being changed, so the gaze component publishes the event so that subscribing components can act accordingly. As such, an ambient component may respond to the shifting gaze of the character by triggering a single blink as part of an overall saccade eye movement of the character.

Behavior Component Evaluation Method for Determining Lifelike Behavior Outputs that Drive Character Animation As noted above, the plurality of behavior components are designed with an input/output architecture. Specifically, each behavior component generates outputs from its inputs and these outputs can then become input for another behavior component or drive animation in the animation system. The next example, described by reference to FIG. 2, is an example of a behavior component evaluation method for evaluating an input by a behavior component and determining whether to generate and publish an output based on the evaluation of the input by the behavior component.

Figure 2:
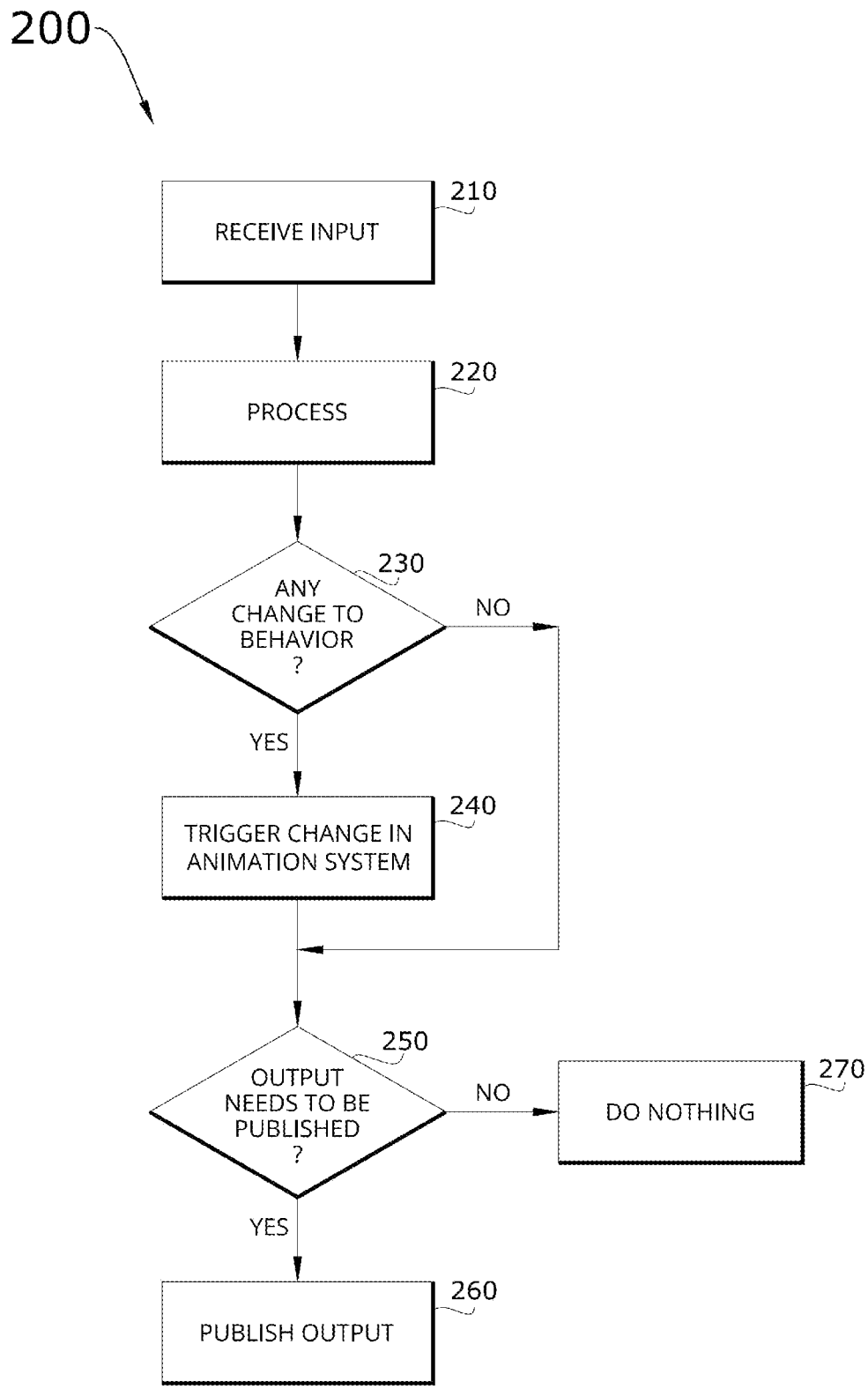
FIG. 2 conceptually illustrates a behavior component evaluation method for evaluating an input by a behavior component and determining whether to generate and publish an output based on the evaluation of the input by the behavior component in some embodiments.

Specifically, FIG. 2 conceptually illustrates a behavior component evaluation method 200 for evaluating an input by a behavior component and determining whether to generate and publish an output based on the evaluation of the input by the behavior component in some embodiments. As shown in this figure, the behavior component evaluation method 200 starts when a behavior component receives a contextual input (at 210). The behavior component then processes (at 220) the received input. Based on the results of the processed input, the behavior component evaluation method 200 determines (at 230) whether the contextual input results in any change to behavior of the character. When no change is identified, the behavior component evaluation method 200 transitions to a step for determining whether output needs to be published or not (at 250), which is described below. On the other hand, when a change in behavior is detected (at 230), then the behavior component evaluation method 200 moves to a step at which the behavior component triggers the change in the animation system (at 240). This is followed by the step for determining (at 250) whether the output to the animation system needs to be published or not. When there was no change to the character, the output may be non-existent or a simple message indicating no change, and therefore, does not need to be published for the other component. In that case, the behavior component evaluation method 200 moves to the step for doing nothing (at 270), at least with respect to the current received input. However, when a change in behavior was recognized (at 230), the determination of whether the output needs to be published (at 250) would be affirmative ('YES'). Accordingly, the behavior component evaluation method 200 would move to the next step at which the behavior component would publish the output (at 260) so that other behavior components could receive the published event as input. The behavior component evaluation method 200 would continue like this for each input and all of the behavior components working through their inputs simultaneously or contemporaneously. Thus, if multiple components were processing a single input, the outputs from each of the components may be different (since they only affect the behavior of the character with respect to their respective area of responsibility), but the animation system would receive them as animation data to process collectively in carrying the resulting animation of the character. While the behavior component evaluation method 200 described above only relates generally to the behavior components, additional, specific exemplary descriptions of several behavior components utilized in at least one embodiment, are described further below.

Publish/Subscribe Architecture

Furthermore, in some embodiments of the synthetic lifelike behavioral character animation system, the publish/subscribe architecture is designed to allow chain events which could result in unexpected emergent behavior. For example, emergent behavior may arise when an input from a natural language system causes a rise in excitement, which increases how energized the behavior of the character is. This excitement causes the character to move around with more energy and switch their attention from target to target more readily. Consequently, more stimulus from visual and auditory input occurs (which would vary greatly depending on the environment). The consequent visual and auditory inputs result in further input into the behavior components which possibly cascades into yet more changes. This process might settle once the character is in a more calming environment or the user decides to communicate with the character in a way that has a calming effect.

Figure 3:
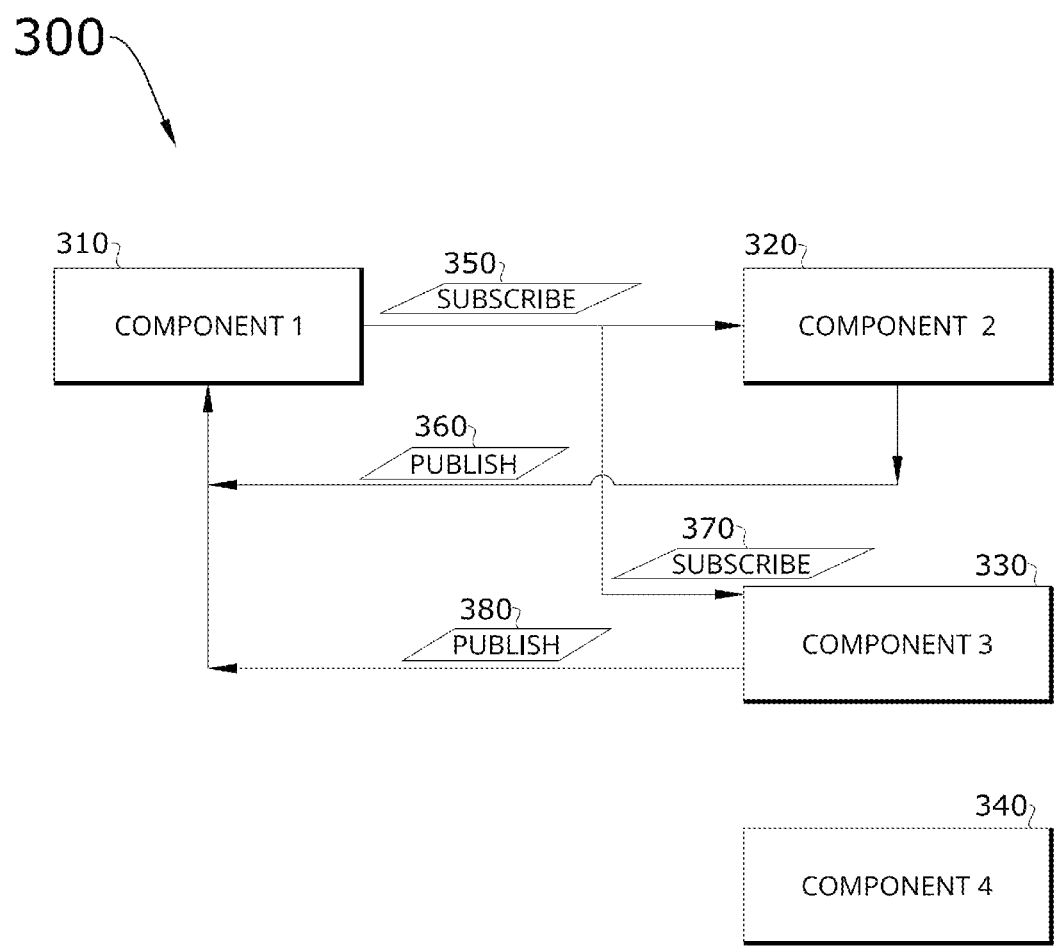
FIG. 3 conceptually illustrates an exemplary component subscription and publication configuration for a plurality of behavior components in some embodiments.

By way of example, FIG. 3 conceptually illustrates an exemplary component subscription and publication configuration 300 for a plurality of behavior components in some embodiments. As shown in this figure, a first component 310 ("COMPONENT 1"), a second component 320 ("COMPONENT 2"), a third component 330 ("COMPONENT 3"), and a fourth component 340 ("COMPONENT 4") are present. The first component 310 has subscribed (at 350) to the second component 320 and also subscribed (at 370) to the third component 330. Thus, when the second component 320 triggers a behavior change output for the character, the output is published as an event that the first component 310 receives as input. Similarly, when the third component 330 triggers another behavior change output for the character, the output is published as another event that the first component 310 receives as input. Notably, the fourth component 340 has not subscribed to the second component 320 or the third component 330 (but may have subscribe to the first component 310, yet we cannot see in this figure because the first component 310 has not triggered a behavior change event). Similarly, the second component 320 has not subscribed to the third component 330 (otherwise, the second component 320 would have received the published event of the third component 330) and the third component 330 has not subscribed to the second component 320 (or it would have received the published event from the second component 320).

Plurality of Behavior Components

By way of example, assume the plurality of behavior components of a particular implementation of the synthetic lifelike behavioral character animation system comprises the action component, the ambient component, the attention component, the emotion component, the gaze component, the gesture component, the locomotion component, the perception component, and the speech component. If the emotion component receives emotional metadata from a system external source, then the emotional metadata will be received as contextual input which needs to be processed according to the requirements for the emotion component with respect to its individual area of responsibility for the character behavior. Then, if the emotion component processes the emotional metadata input and the emotion component determines that a change in behavior was necessitated by the emotional metadata, then the emotion component would trigger the behavior change output and publish the change as an output event. The output event (and the change of output provided to the animation system) may relate to how relaxed the character is. The other subscribing behavior components can then check to see whether there is any resulting change of their own. For instance, the ambient component, which governs breathing (among other behaviors, which are further described below), may have subscribed to these events and, thus, receives this update to how relaxed the character is. By its own logic, the change in how relaxed the character is (based on the change triggered by the emotion component), the ambient component may then change trigger a change in the interval time between breaths and, as a result, will instruct the animation system to slow down the breathing animation of the character.

In addition to the input/output architecture and the publish/subscribe architecture, the synthetic lifelike behavioral character animation system, the synthetic lifelike behavioral character animation system of some embodiments supports character personality differences by way of parameters that bear on behavior components. Specifically, parameters are variables that are predefined by a designer of a specific character. The defining aspects of the parameter impacts the way a behavior component responds to input or internal processes is further modified by parameters. The set of parameters can vary in different embodiments with the parameters generally created to provide the designer more control over the output behavior of the character. Thus, parameters provide the most direct manner in which a designer is able to affect the style or personality of a character. For instance, a person could modify the parameters to change how reactive a particular character is to changes in emotion. Perhaps when this particular character is happy, they show much more excited animation behavior. By contrast, the parameters that affects changes to emotion of a different character may be set to react different (e.g., the different character becomes more relaxed with changes to emotion).

In some embodiments, the synthetic lifelike behavioral character animation system supports and provides a large range of parameters that can define a multitude of varied behaviors in a given context. For example, the parameters can define factors such as how frequently micro-movements of the eye of a character occur or define a character's preference for certain speaking gestures or other aspects (e.g., how dynamic their emotional changes are, etc.). As such, parameters provide the configuration for the logic of components to support and achieve a consistent style for a character.

In some embodiments, the set of parameters for a character are grouped into a personality. Accordingly, the synthetic lifelike behavioral character animation system supports definitions of personality of characters. Furthermore, the synthetic lifelike behavioral character animation system of some embodiments supports switching between personalities for a character. For example, there may be a character with a defined personality that is a proper, mild mannered businessperson, and it would be possible to swap out the personality for a different personality that is based on a flamboyant friendly customer service assistant. The resulting impact on the behavior components would be demonstrated in the visual animation that is output (assuming you could see the same character with different personalities in the same exact contextual situation).

For practical implementations, the behavior components can be implemented according to the built-in blueprint or scripting systems of game engines, such as Unreal Engine or Unity, or could be implemented in other languages as a plugin or standalone service. In at least one embodiment, the behavior components are implemented using machine learning. In this embodiment, the internal logic of the components are trained machine learning models and the output is inferred using these models.

Animation System

Referring now to the other main component of the synthetic lifelike behavioral character animation system, the animation system is responsible for the animation rules and frame by frame transformations of the character which cause the character to be animated. The animation system governs the "physicality" of the character. In one embodiment, this would be a character rig which is a combination of connected joints and blendshapes which define the physical possibilities of a character.

Animation systems are used in video games where interactive characters are required. However, the animation system of the synthetic lifelike behavioral character animation system described in this disclosure is a slave to the behavior components and its output is largely driven by the triggers and metadata from the components.

Given the timing and style informed by the components, the animation system layers and combines a multitude of animations to generate a final animation output. The layering and blending between animations are governed by rules within the animation system, that given direction from the components, prevents incorrect or physically impossible combinations of animations to occur.

For example, a component determines a change in breathing and it will send a message to the animation system, including normalized values for breathing rate and amplitude. The animation system uses these values to adjust the animation output by adjusting the play rate and intensity of a breathing animation.

In some embodiments, the animation system provides a set of animation blending and state rules which ensure quality animation output and the avoidance of unexpected behavior. For example, if the character is in the middle of shifting weight, it should not suddenly shift weight in the opposite direction and it should not do so without an appropriate transition. These frame-by-frame transformations, or what is normally called "animation", can be created in different ways and they are created in a specific way. These animations are generally modular in nature and are designed to be combined with other animations.

In at least one embodiment, the frame-by-frame transformations are created through the blending of procedural animation and keyframe animation. Procedural animations are calculated transformations, such as the calculated head rotation to look at a target. Keyframe animation is that which is authored by an animator and may be sourced from motion capture or may be hand animated.

In another embodiment, the creation of animation is through machine learning means. For example, a voice audio stream is input into a machine learning model which is then able to infer the correct transformations to mimic the appropriate mouth shapes for that voice input.

These animations are then combined together by the animation system to create a final frame-by-frame output pose. Strung together, this is typically perceived as animation or a moving character. However, the presentation of this animation requires a rendering system, such as those with the Unreal Engine and Unity game engines.

In at least one embodiment, the animation is rendered out in a game engine which combines the animation system and the rendering system. In another embodiment, the animation is ingested by a machine learning model which then neutrally renders a character based on that input.

Component Breakdown for Behavior Components in at Least One Embodiment of the Synthetic Lifelike Behavioral Character Animation System As noted above, the plurality of behavior components of the synthetic lifelike behavioral character animation system may change depending on requirements or needs, but that the overarching concept is that collectively, the plurality of behavior components simulate the lifelike behavior of the character. A particular embodiment of the synthetic lifelike behavioral character animation system demonstrates a collection of components that make up the plurality of behavior components. The component breakdown is described next.

In some embodiments, the plurality of components comprises the action component, the ambient component, the attention component, the emotion component, the gaze component, the gesture component, the locomotion component, the perception component, and the speech component.

In some embodiments, the action component is responsible for the voluntary or conscious actions of the character. These actions are generally interactive in nature, whether it is with the user or the environment. The action component will maintain awareness of what else is happening with the character or may issue override triggers so that an action directed by an external system may take place. These actions generally will have some interactive nature, such as picking up an object, pointing to something or giving a high five.

In some embodiments, the ambient component governs the subtle movements of the character that make them feel alive. The ambient component maintains timing intervals (that are modified by parameters) and triggers different micro behaviors at appropriate times, such as for breathing, blinking, eye micro movements, body and head micro movements, balancing and adjustments, and facial micro movements. Changes in emotion will often influence the output of the ambient component. For instance, a change in breathing rate based on how tense the character is.

In some embodiments, the attention component manages what the character is focused on. From perception input, the attention component has logic that determines whether the character should change what its attention is on as well as maintain what it has its primary attention on and what other entities it is holding in its peripheral attention. The attention component does not directly trigger any animation behavior. Instead, the attention component provides context for other components. The attention component may also receive input from external systems that script the interaction (e.g., causing the character to look at a product in a store that they are referring to in their dialog). Any changes in attention will be published to listening components, such as the gaze component. For instance, the attention component might change the character's gaze given the character's attention is now on something new.

In some embodiments, the emotion component processes input that affects the emotion of a character and then outputs behavior modifiers that other behavior components can use to modify animation behavior. The parameters within the emotion component influence how the character behaves as a result of changes in emotion. For instance, one character may get more energetic in their movement as they become happier, while another character may become more relaxed. To achieve this control, emotion values such as joy, sadness and anger, are mapped to behavior modifiers. Therefore, we can define parameters for a character where an increase in joy tends the tense/relaxed behavior modifier value toward more relaxed. Example behavior modifiers include, without limitation, Tense vs Relaxed, Calm vs Energized, Subdued vs Expressive, and Distracted vs Attentive. An example input might be the perception component notifying of a loud sudden sound. This might cause a sudden change in emotion to be fearful.

In some embodiments, the gaze component governs what the character is looking at. This may be to look at a target that has been provided by the attention component, but also governs the look aways of the character, perhaps while speaking and what happens during gaze changes. For instance, a gaze change might be small and may require a smaller head movement compared with a larger gaze change that requires a larger head movement and a blink.

In some embodiments, the gesture component is responsible for movements of a character that normally would not be conscious to the character or intentional by the character. For example, hand gestures used during speech, rubbing hands together, or adjusting/stretching the neck. Gestures can be triggered from manually scripted instructions from the natural language processing system but could also be triggered during speech or as a result of emotional state changes.

In some embodiments, the locomotion component is responsible for moving a character around the environment. The locomotion component receives input from other components that influence the target location of its movement and also considers how the character might move to get there. For instance, the locomotion component determines whether a character should run, walk, or crawl. The parameters around locomotion would also affect how the character would move. For example, is there a maximum speed that the character should move at or does the character always prefer the route requiring least physical effort? The locomotion component broadcasts to others its locomotion state. For example, the locomotion component broadcasts (publishes) whether its locomotion state is current moving (i.e., the character is moving) or standing still (i.e., the character stands and waits). The information from these changes in state are important as they affect what behaviors the character can and cannot currently perform.

In some embodiments, the perception component is responsible for the character's senses. In an environment, there are various sensory stimuli that the character may perceive. Sight and sound are the most common senses. However, taste, touch, and smell are also able to be simulated in virtual environments. The perception component takes these inputs and is able to apply logic to determine what the character might need to consider. For example, the user might be speaking to the character from a distance. The perception component receives audio input from the scene and determines whether the audio is audible enough to register as something to react to. Parameters of the perception component would determine how sensitive the hearing is of the character. Should the perception component ascertain this audio is vocal input and is audible, it would then broadcast an event notifying other components of this vocal input and a classification that the input is barely audible. Other components may then cause the character to turn toward the sound, walk closer to it, cup a hand to their ear or any other behavior that would be suitable for a barely audible voice. The perception component may also employ other machine learning techniques to aid in its ability to perform in novel environments. For example, the perception component could receive a visual input stream and a machine learning model would classify and describe the scene which could then be used by a natural language generation system for dialog related to what the character can see.

In some embodiments, the speech component is responsible for the speech behavior of the character. Together with its parameters and input from other components, the speech component governs the speaking style of the character, which can change given the context. For example, the amount the head moves during speech or the frequency of hand gestures could be fine-tuned to suit a particular personality. Furthermore, changes in emotion or perception can change the way an utterance is spoken (e.g., when excited or in loud environments).

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 4:
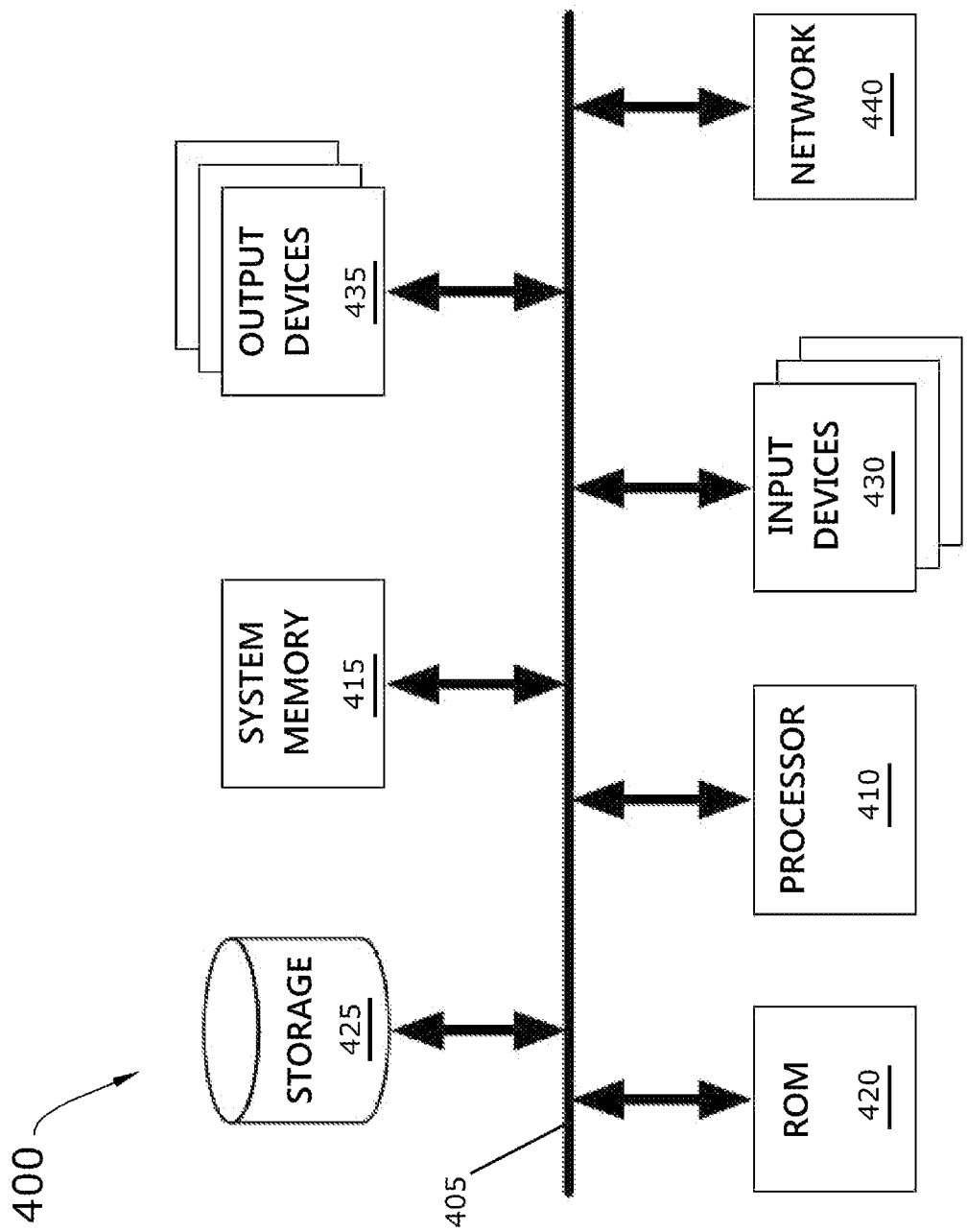
FIG. 4 conceptually illustrates an electronic system with which some embodiments of the invention are implemented.

By way of example, FIG. 4 conceptually illustrates an electronic system 400 with which some embodiments of the invention are implemented. The electronic system 400 may be a desktop computing device, a server computer, a workstation, a single board computer (SBC), a mobile device, a smartphone, a tablet computing device, etc. Such an electronic system includes various types of computer readable media and interfaces for various other types of computer readable media. Electronic system 400 includes a bus 405, processing unit(s) 410, a system memory 415, a read-only memory 420, a permanent storage device 425, input devices 430, output devices 435, and a network 440.

The bus 405 collectively represents all system, peripheral, and chipset buses that communicatively connect the numerous internal devices of the electronic system 400. For instance, the bus 405 communicatively connects the processing unit(s) 410 with the read-only memory 420, the system memory 415, and the permanent storage device 425. From these various memory units, the processing unit(s) 410 retrieves instructions to execute and data to process in order to execute the processes of the invention. The processing unit(s) may be a single processor or a multi-core processor in different embodiments.

The read-only-memory (ROM) 420 stores static data and instructions that are needed by the processing unit(s) 410 and other modules of the electronic system. The permanent storage device 425, on the other hand, is a read-and-write memory device. This device is a non-volatile memory unit that stores instructions and data even when the electronic system 400 is off Some embodiments of the invention use a mass-storage device (such as a magnetic or optical disk and its corresponding disk drive) as the permanent storage device 425.

Other embodiments use a removable storage device (such as a floppy disk or a flash drive) as the permanent storage device 425. Like the permanent storage device 425, the system memory 415 is a read-and-write memory device. However, unlike storage device 425, the system memory 415 is a volatile read-and-write memory, such as a random access memory. The system memory 415 stores some of the instructions and data that the processor needs at runtime. In some embodiments, the invention's processes are stored in the system memory 415, the permanent storage device 425, and/or the read-only memory 420. For example, the various memory units include instructions for processing appearance alterations of displayable characters in accordance with some embodiments. From these various memory units, the processing unit(s) 410 retrieves instructions to execute and data to process in order to execute the processes of some embodiments.

The bus 405 also connects to the input and output devices 430 and 435. The input devices enable the user to communicate information and select commands to the electronic system. The input devices 430 include alphanumeric keyboards (including virtual keyboards), pointing devices (also called "cursor control devices"), cameras (video cameras, motion capture systems, etc.), audio devices (microphones, etc.). The output devices 435 display images generated by the electronic system 400. The output devices 435 include display devices, such as liquid crystal displays (LCD) and organic light emitting diode (OLED) displays. Some embodiments include devices such as a touchscreen that functions as both input and output devices.

Finally, as shown in FIG. 4, bus 405 also couples electronic system 400 to a network 440 through a network adapter (not shown). In this manner, the computer can be a part of a network of computers (such as a local area network ("LAN"), a wide area network ("WAN"), or an intranet), or a network of networks (such as the Internet). Any or all components of electronic system 400 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

The above-described embodiments of the invention are presented for purposes of illustration and not of limitation. While these embodiments of the invention have been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A synthetic lifelike behavioral character animation system comprising:
   a processor; and
   a memory storing instructions that are executable by the processor to implement:
      a plurality of behavior components that provide modularized representations of behavior of a character based on contextual input;
      a publish/subscribe architecture that provides a communication framework between the plurality of behavior components, wherein a first one of the behavior components subscribes to a second one of the behavior components,
         wherein, responsive to the second one of the behavior components publishing output formed as output events and corresponding metadata, the publish/subscribe architecture provides the output formed as output events and corresponding metadata from the second one of the behavior components as input to the subscribed first one of the behavior components, based on a previous subscribing of the first one of the behavior components to the second one of the behavior components; and
      an animation system that simulates movement and behavior of the character based on the modularized representations of behavior provided by the plurality of behavior components.

2. The synthetic lifelike behavioral character animation system of claim 1, wherein the plurality of behavior components comprises:
   an action component,
   an ambient component,
   an attention component,
   an emotion component,
   a gaze component,
   a gesture component,
   a locomotion component,
   a perception component, and
   a speech component.

3. The synthetic lifelike behavioral character animation system of claim 1 further comprising an input/output functional architecture that triggers contextual input to be received by one or more behavior components in the plurality of behavior components, wherein the one or more behavior components process the received contextual input and determine whether to provide an output to the animation system.

4. The synthetic lifelike behavioral character animation system of claim 3, wherein a particular output is provided from a particular behavior component to the animation system when the particular behavior component determines that a change in behavior of the character occurred based on the processed input.

5. The synthetic lifelike behavioral character animation system of claim 4, wherein the particular behavior component publishes an output event based on the particular output.

6. The synthetic lifelike behavioral character animation system of claim 5, wherein the particular output comprises instructions for the animation system to change behavior of the character in a particular area of responsibility associated with the particular behavior component.

7. The synthetic lifelike behavioral character animation system of claim 6, wherein three other behavior components in the plurality of behavior components that are different from the particular behavior component subscribe to events published by the particular behavior component.

8. The synthetic lifelike behavioral character animation system of claim 7, wherein the three other behavior components receive the output event, published by the particular behavior component, as contextual input.

9. The synthetic lifelike behavioral character animation system of claim 8, wherein the three other behavior components process the output event received as contextual input.

10. The synthetic lifelike behavioral character animation system of claim 9, wherein a first behavior component in the three other behavior components determines that the output event received and processed as contextual input does not cause a change in behavior for the character in a first area of responsibility of the first behavior component.

11. The synthetic lifelike behavioral character animation system of claim 9, wherein the output event is a first output event, wherein a second behavior component in the three other behavior components determines that the output event received and processed as contextual input results in a second change in behavior for the character in a second area of responsibility of the second behavior component, wherein the second behavior component provides a second output with instructions to the animation system to render the second change in behavior for the character, wherein the second output is published as a second output event based on the second change in behavior in the second area of responsibility, wherein the second output event is received and processed as contextual input by a third behavior component in the three other behavior components.

12. The synthetic lifelike behavioral character animation system of claim 11, wherein the third behavior component determines that the first output event received and processed as contextual input does not cause a change in behavior for the character in a third area of responsibility of the third behavior component.

13. The synthetic lifelike behavioral character animation system of claim 12, wherein the third behavior component determines that the second output event received and processed as contextual input results in a third change in behavior for the character in the third area of responsibility of the third behavior component, wherein the third behavior component provides a third output with instructions to the animation system to render the third change in behavior for the character, wherein the third output is published as a third output event based on the third change in behavior in the third area of responsibility.

14. The synthetic lifelike behavioral character animation system of claim 13, wherein the first output event, the second output event, and the third output event comprise a chain of events that give rise to an emergent behavior of the character.

* * * * *